US008607075B2

(12) United States Patent
Gough et al.

(10) Patent No.: US 8,607,075 B2
(45) Date of Patent: Dec. 10, 2013

(54) IDLE DURATION REPORTING FOR POWER MANAGEMENT

(75) Inventors: Robert E. Gough, Cornelius, OR (US); Seh W. Kwa, Saratoga, CA (US); Neil W. Songer, Santa Clara, CA (US); Jaya L. Jeyaseelan, Cupertino, CA (US); Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 12/347,573

(22) Filed: Dec. 31, 2008

(65) Prior Publication Data

US 2010/0169685 A1 Jul. 1, 2010

(51) Int. Cl.
*G06F 1/32* (2006.01)

(52) U.S. Cl.
USPC ............................ 713/300; 713/320; 713/323

(58) Field of Classification Search
USPC .................................. 713/300, 320, 323, 324
See application file for complete search history.

(56) References Cited

U.S. PATENT DOCUMENTS

| 6,965,763 | B2 * | 11/2005 | Bussan et al. ............... 455/343.4 |
| 7,430,673 | B2 | 9/2008 | Kardach et al. |
| 7,493,228 | B2 | 2/2009 | Kwa et al. |
| 7,725,591 | B2 * | 5/2010 | Doering et al. ............... 709/230 |
| 7,752,473 | B1 | 7/2010 | Kwa et al. |
| 7,864,720 | B2 | 1/2011 | Jeyaseelan |
| 7,979,234 | B2 | 7/2011 | Kwa et al. |
| 7,984,314 | B2 | 7/2011 | Cooper et al. |
| 8,176,341 | B2 | 5/2012 | Jeyaseelan et al. |
| 8,255,713 | B2 | 8/2012 | Jeyaseelan et al. |
| 8,332,675 | B2 | 12/2012 | Kwa et al. |
| 8,341,445 | B2 | 12/2012 | Cooper et al. |
| 8,427,993 | B2 | 4/2013 | Jeyaseelan |
| 2003/0210658 | A1 * | 11/2003 | Hernandez et al. ........... 370/311 |
| 2005/0144487 | A1 | 6/2005 | Puffer et al. |
| 2005/0210312 | A1 | 9/2005 | Maruichi et al. |
| 2006/0294179 | A1 | 12/2006 | Kwa et al. |
| 2007/0005995 | A1 | 1/2007 | Kardach et al. |
| 2008/0288798 | A1 | 11/2008 | Cooper et al. |
| 2008/0298289 | A1 | 12/2008 | Jeyaseelan |
| 2009/0077396 | A1 * | 3/2009 | Tsai et al. ..................... 713/310 |
| 2009/0172434 | A1 | 7/2009 | Kwa et al. |
| 2010/0169684 | A1 | 7/2010 | Jeyaseelan et al. |
| 2011/0078473 | A1 | 3/2011 | Kwa et al. |
| 2012/0198248 | A1 | 8/2012 | Jeyaseelan et al. |
| 2012/0324265 | A1 | 12/2012 | Jeyaseelan et al. |
| 2013/0132755 | A1 | 5/2013 | Cooper et al. |

FOREIGN PATENT DOCUMENTS

| CN | 101159509 A | 4/2008 |
| WO | 2005066765 A2 | 7/2005 |

OTHER PUBLICATIONS

State Intellectual Property Office, P.R. China, Office Action for corresponding Patent Application No. 200911000220.X, issued Feb. 22, 2012, 4 pages.
English Translation of State Intellectual Property Office, P.R. China, Office Action for corresponding Patent Application No. 200911000220.X, issued Feb. 22, 2012, 8 pages.

(Continued)

*Primary Examiner* — Paul Yanchus, III
(74) *Attorney, Agent, or Firm* — Matthew C. Fagan

(57) ABSTRACT

For one disclosed embodiment, data corresponding to an idle duration for one or more downstream devices may be received. Power may be managed based at least in part on the received data. Other embodiments are also disclosed.

18 Claims, 8 Drawing Sheets

(56) References Cited

OTHER PUBLICATIONS

State Intellectual Property Office, P.R. China, Office Action for corresponding Patent Application No. 200911000220.X issued Feb. 1, 2013, 5 pages.
English Translation of State Intellectual Property Office, P.R. China, Office Action for corresponding Patent Application No. 200911000220.X, issued Feb. 1, 2013, 9 pages.
German Patent and Trade Mark Office, Office Action for corresponding Patent Application No. 10 2009 060 267.4, issued Feb. 17, 2012, 4 pages.
English Translation of German Patent and Trade Mark Office, Office Action for corresponding Patent Application No. 10 2009 060 267.4, issued Feb. 17, 2012, 4 pages.
Japan Patent Office, Office Action for corresponding Patent Application No. 2009-291091, mailed Nov. 1, 2011, 4 pages.
English Translation of Japan Patent Office, Office Action for corresponding Patent Application No. 2009-291091, mailed Nov. 1, 2011, 4 pages.
Japan Patent Office, Office Action for corresponding Patent Application No. 2009-291091, mailed Jan. 15, 2013, 2 pages.
English Translation of Japan Patent Office, Office Action for corresponding Patent Application No. 2009-291091, mailed Jan. 15, 2013, 3 pages.
Korean Intellectual Property Office, Notice of Preliminary Rejection for corresponding Patent Application No. 10-2009-131316, mailed Mar. 30, 2011, 4 pages.
English Translation of Korean Intellectual Property Office, Notice of Preliminary Rejection for corresponding Patent Application No. 10-2009-131316, mailed Mar. 30, 2011, 4 pages.
Korean Patent Abstracts, Publication No. 10-2007-0112660A which was published Nov. 27, 2007, 1 page.
Patent Abstracts of Japan, Publication No. 2004-320153 which was published Nov. 11, 2004, 1 page.
Patent Abstracts of Japan, Publication No. 2005-157799 which was published Jun. 16, 2005, 1 page.
Patent Abstracts of Japan, Publication No. 2005-234826 which was published Sep. 2, 2005, 1 page.
Patent Abstracts of Japan, Publication No. 2007-316782 which was published Dec. 6, 2007, 1 page.
Ajanovic, Jasmin, PCI Express* (PCIe*) Accelerator Features, Intel Corporation, White Paper, 10 pages (2008).
Cooper, Barnes, et al., Designing Power-Friendly Devices, Microsoft Windows Hardware Engineering Conference (WinHEC) 2007, Intel Corporation, 27 pages (May 8, 2007).
Jeyaseelan, Jaya, Energy Efficient Platforms—New Power Management Extensions, Intel Developer Forum, 34 pages (2008).
Intel Corporation, Designing Power-Friendly Devices, White Paper, 18 pages (2007).
PCI-SIG, PCIe Enhancements for Platform PM Improvement—Latency Tolerance Reporting, 6 pages (Dec. 12, 2007).
PCI-SIG, PCIe Enhancements for Platform PM Improvement—Optimized Buffer Flush/Fill, 7 pages (Dec. 12, 2007).
Latency Tolerance Reporting, PCI-SIG Draft Engineering Change Request, 6 pages (Jan. 22, 2008).
Latency Tolerance Reporting, PCI-SIG Draft Engineering Change Request, 6 pages (Jan. 22, 2008, updated Feb. 5, 2008).
Latency Tolerance Reporting, PCI-SIG Draft Engineering Change Request, 6 pages (Jan. 22, 2008, updated Feb. 8, 2008).
Latency Tolerance Requirement Reporting, PCI-SIG Draft Engineering Change Request, 13 pages (Jan. 22, 2008, updated May 16, 2008).
Latency Tolerance Requirement Reporting, PIC-SIG Draft Engineering Change Request, 13 pages (Jan. 22, 2008, updated Jun. 18, 2008).
Latency Tolerance Requirement Reporting, PCI-SIG Draft Engineering Change Request, 13 pages (Jan. 22, 2008, updated Jun. 19, 2008).
Latency Tolerance Reporting, PCI-SIG Draft Engineering Change Notice, 11 pages (Jan. 22, 2008, updated Aug. 9, 2008).
Latency Tolerance Reporting, PCI-SIG Engineering Change Notice, 11 pages (Jan. 22, 2008, updated Aug. 14, 2008).
Latency Tolerance & B/W Requirement Reporting, PCI-SIG Draft Engineering Change Request, 8 pages (Jan. 22, 2008, updated Feb. 19, 2008).
Opportunistic Buffer Flush/Fill, PCI-SIG Draft Engineering Change Request, 9 pages (Feb. 8, 2008, updated Feb. 19, 2008).
PCI-SIG, PCI Express Base Specification, Revision 1.0, 422 pages (Jul. 22, 2002).
PCI-SIG, PCI Express Base Specification, Revision 2.0, 608 pages (Dec. 20, 2006).
Universal Serial Bus Specification, Revision 2.0, 650 pages (Apr. 27, 2000).
USB 2.0 Link Power Management Addendum, Engineering Change Notice, 29 pages (Jul. 16, 2007).
Universal Serial Bus 3.0 Specification, Revision 1.0, 482 pages (Nov. 12, 2008).
Taiwan Intellectual Property Office, Office Action and Search Report for corresponding Patent Application No. 098144511, dated Aug. 26, 2013, 9 pages.
English Translation of Taiwan Intellectual Property Office, Office Action and Search Report for corresponding Patent Application No. 098144511, dated Aug. 26, 2013, 7 pages.

* cited by examiner

IDLE DURATION REPORTING FOR POWER MANAGEMENT

FIELD

Embodiments described herein generally relate to power management.

BACKGROUND

Power management is used in many devices and systems to improve power efficiency, helping to reduce power consumption and/or heat dissipation. For battery-powered mobile devices and systems, power management can help extend operation.

Some platform-level power management may place a processor and/or a chipset into a lower power state which can impact input/output (I/O) performance. As one example where a platform supports bus mastering, an I/O device may initiate a data transfer to system memory when a processor and chipset are in a lower power state. The processor and chipset would have to return to a normal operating state to complete the data transfer and therefore introduce delay which reduces performance.

BRIEF DESCRIPTION OF THE DRAWINGS

Embodiments are illustrated by way of example and not limitation in the figures of the accompanying drawings, in which like references indicate similar elements and in which.

The figures of the drawings are not necessarily drawn to scale.

DETAILED DESCRIPTION

The following detailed description sets forth example embodiments of apparatuses, methods, and systems relating to idle duration reporting for power management. Features, such as structure(s), function(s), and/or characteristic(s) for example, are described with reference to one embodiment as a matter of convenience; various embodiments may be implemented with any suitable one or more described features.

Figure 1:
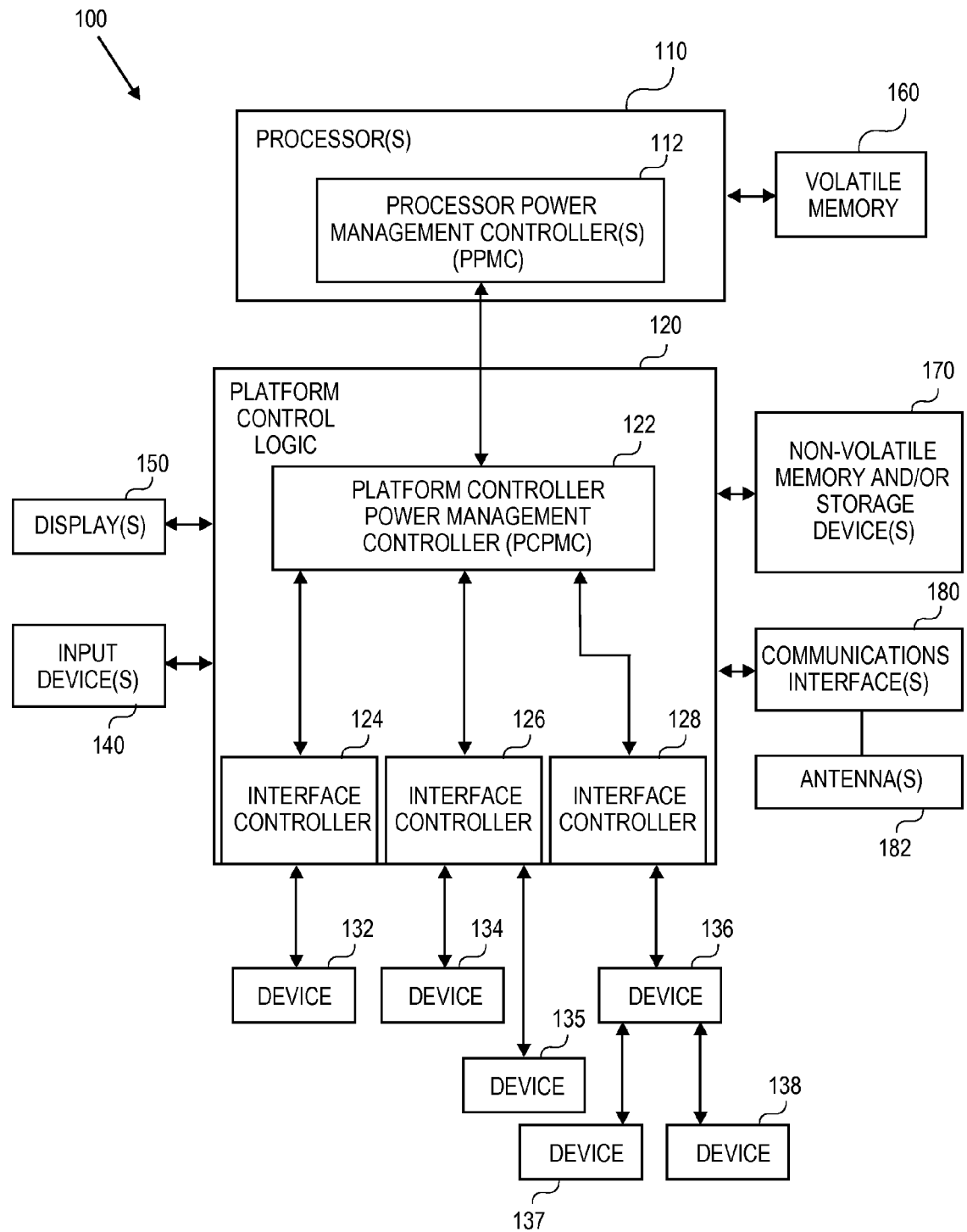
FIG. 1 illustrates, for one embodiment, a block diagram of an example system to manage power based at least in part on idle duration reporting from one or more downstream devices.

FIG. 1 illustrates an example system 100 comprising one or more processors 110 and platform control logic 120 coupled to processor(s) 110. Processor(s) 110 for one embodiment may have one or more processor power management controllers (PPMCs) 112 to help improve power efficiency for processor(s) 110. Platform control logic 120 for one embodiment may have a platform controller power management controller (PCPMC) 122 to help improve power efficiency for system 100. PCPMC 122 for one embodiment may, for example, be coupled to manage one or more components of system 100 to enter into one of a plurality of lower power or sleep states when the component is less active or idle.

PCPMC 122 for one embodiment may help coordinate power management for components of system 100 to help improve power efficiency. PCPMC 122 for one embodiment may, for example, be coupled to coordinate with one or more PPMCs 112 for such PPMC(s) 112 and PCPMC 122 to better identify when and how deep one or more components may enter a lower power or sleep state with reduced concern for reduced performance.

PPMC(s) 112 and PCPMC 122 may each be implemented in any suitable manner using any suitable logic such as, for example, any suitable hardware, any suitable hardware performing any suitable firmware, any suitable hardware performing any suitable software, or any suitable combination of such implementations. For one embodiment, any such firmware and/or software may be stored in any suitable computer readable storage medium or media such as, for example, volatile memory 160 and/or one or more non-volatile memory and/or storage devices 170.

PCPMC 122 for one embodiment may receive data corresponding to an idle duration for one or more downstream devices, such as device 132 for example. PCPMC 122 for one embodiment may manage power based at least in part on the received data and therefore based at least in part on the corresponding idle duration. The idle duration for one embodiment may correspond to an amount of time at least a portion of a device will be idle from about the current time going forward. The idle duration for one embodiment may correspond to an amount of time at least a portion of a device will not communicate with an upstream device from about the current time going forward. The idle duration for one embodiment may correspond to a minimum amount of time at least a portion of a device will be idle. The idle duration for one embodiment may correspond to amount of time when at least a portion of a device will next communicate with an upstream device. PCPMC 122 for one embodiment may receive over time different idle durations for a device depending, for example, at least in part on how often and when at least a portion of the device is idle.

By identifying how long one or more downstream devices will be idle based at least in part on received data corresponding to an idle duration, PCPMC 122 for one embodiment may better identify when, how long, and how deep one or more components of system 100 may enter a lower power or sleep state and still be responsive to one or more downstream devices with reduced concern for reduced performance.

PCPMC 122 for one embodiment may transition one or more components of system 100 to a lower power state in response to receipt of data corresponding to an idle duration. PCPMC 122 for one embodiment may transition one or more components of system 100 from a lower power state based at least in part on when an idle duration will expire. PCPMC 122 for one embodiment may repeatedly identify based at least in part on received data an idle duration for a downstream device that will expire next, transition to a lower power state, and then transition from the lower power state prior to expiration of the idle duration to respond to a potential communication from the downstream device. The depth and duration of the lower power state may be determined based at least in part on the idle duration that will expire next and the resume delay for the lower power state. Transitioning to and from lower power states in this manner for one embodiment may help PCPMC 122 reduce power by reducing unnecessary power state transitions for PCPMC 122. PCPMC 122 for one embodiment may include one or more timers to help identify when idle durations will expire.

For one embodiment, for example, where platform control logic 120 supports bus mastering and allows a downstream device to initiate a data transfer, for example to volatile memory 160, PCPMC 122 for one embodiment may avoid having one or more components to be used for the data transfer in a lower power state when the downstream device initiates the data transfer.

Platform control logic 120 for one embodiment may comprise interface controllers 124, 126, and 128 to communicate with devices 132, 134, 135, 136, 137, and 138. Interface controllers 124, 126, and 128 may each be implemented in any suitable manner using any suitable logic such as, for example, any suitable hardware, any suitable hardware performing any suitable firmware, any suitable hardware performing any suitable software, or any suitable combination of such implementations. For one embodiment, any such firmware and/or software may be stored in any suitable computer readable storage medium or media such as, for example, volatile memory 160 and/or one or more non-volatile memory and/or storage devices 170. One or more of interface controllers 124, 126, and 128 for one embodiment may be compatible with any suitable one or more standard specifications such as, for example and without limitation, any suitable Peripheral Component Interface (PCI) or PCI Express (PCIe) specification (e.g., PCI Express Base Specification Revision 1.0, Jul. 22, 2002; PCI Express Base Specification Revision 2.0, Jan. 15, 2007). Although illustrated as having three interface controllers to communicate with six devices, platform control logic 120 may comprise any suitable number of one or more interface controllers to communicate with any suitable number of one or more devices.

Interface controller 124 for one embodiment may be coupled to receive data corresponding to an idle duration for downstream device 132. Interface controller 124 for one embodiment may be coupled to transmit to PCPMC 122 data corresponding to an idle duration for device 132. Interface controller 124 for one embodiment may be coupled to transmit to PCPMC 122 received data corresponding to an idle duration for device 132.

Interface controller 126 for one embodiment may be coupled to receive data corresponding to an idle duration for downstream device 134 and may be coupled to receive data corresponding to an idle duration for downstream device 135. Interface controller 126 for one embodiment may include any suitable logic, such as bus agent logic, bridge logic, or hub logic for example, to communicate with both downstream devices 134 and 135. Interface controller 126 for one embodiment may be coupled to transmit to PCPMC 122 data corresponding to an idle duration for device 134 and data corresponding to an idle duration for device 135. Interface controller 126 for one embodiment may be coupled to transmit to PCPMC 122 received data corresponding to an idle duration for device 134 and/or received data corresponding to an idle duration for device 135. For one embodiment where idle durations for device 134 and/or 135 may overlap, interface controller 126 for one embodiment may be coupled to transmit to PCPMC 122 data corresponding to any pending idle duration for device 134 or device 135 that will expire next.

Interface controller 128 for one embodiment may be coupled to receive data corresponding to an idle duration for downstream device 136. Data corresponding to an idle duration for device 136 for one embodiment may correspond to an idle duration for device 137 or device 138 downstream from device 136. Interface controller 128 for one embodiment may be coupled to transmit to PCPMC 122 data corresponding to an idle duration for device 136. Interface controller 128 for one embodiment may be coupled to transmit to PCPMC 122 received data corresponding to an idle duration for device 136.

Device 136 for one embodiment may be coupled to receive data corresponding to an idle duration for downstream device 137 and may be coupled to receive data corresponding to an idle duration for downstream device 138. Device 136 for one embodiment may be coupled to transmit to interface controller 128 data corresponding to an idle duration for device 137 and data corresponding to an idle duration for device 138. Device 136 for one embodiment may be coupled to transmit to interface controller 128 received data corresponding to an idle duration for device 137 and/or received data corresponding to an idle duration for device 138. For one embodiment where idle durations for device 137 and/or 138 may overlap, device 136 for one embodiment may be coupled to transmit to interface controller 128 data corresponding to any pending idle duration for device 137 or device 138 that will expire next.

One or more of interface controllers 124, 126, and 128 for one embodiment may include a power management controller to help improve power efficiency for the interface controller and/or for the connection or link to one or more devices. One or more of interface controllers 124, 126, and 128 for one embodiment may receive data corresponding to an idle duration for a device and manage power based at least in part on the received data and therefore based at least in part on the corresponding idle duration. PCPMC 122 for one embodiment may indirectly manage power based at least in part on an idle duration for a device based at least in part on how a corresponding interface controller manages power based at least in part on that idle duration.

One or more of interface controllers 124, 126, and 128 for one embodiment may indirectly manage power based at least in part on an idle duration for a downstream device. As one example, device 136 for one embodiment may receive from device 137 data corresponding to an idle duration for device 137 and manage power for device 136 based at least in part on the received data and therefore based at least in part on the corresponding idle duration. Interface controller 128 for one embodiment may indirectly manage power based at least in part on that idle duration based at least in part on how device 136 manages power based at least in part on that idle duration.

One or more PPMCs 112 for one embodiment may coordinate with PCPMC 122 and also manage power based at least in part on an idle duration for a downstream device. PCPMC 122 for one embodiment may transmit data corresponding to an idle duration for a device to one or more PPMCs 112 for such PPMC(s) 112 to manage power based at least in part on that idle duration. One or more PPMCs 112 for one embodiment may manage power based at least in part on an idle duration similarly as PCPMC 122. One or more PPMCs 112 for one embodiment may include one or more timers to help identify when idle durations will expire. One or more PPMCs 112 for one embodiment may indirectly manage power based at least in part on an idle duration for a device based at least in part on how PCPMC 122 manages power based at least in part on that idle duration.

Figure 2:
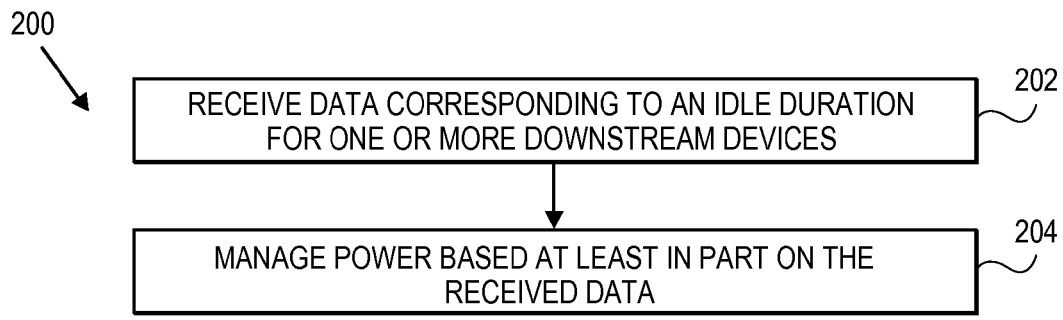
FIG. 2 illustrates, for one embodiment, an example flow diagram to manage power based at least in part on idle duration reporting from one or more downstream devices.

FIG. 2 illustrates an example flow diagram 200 for one embodiment to manage power based at least in part on idle duration reporting from one or more downstream devices. As illustrated in FIG. 2, data corresponding to an idle duration for one or more downstream devices may be received for block 202. For one embodiment with reference to FIG. 1, device 136, interface controller 124, 126, and/or 128, and/or PCPMC 122 may receive data for block 202. For block 204, power may be managed based at least in part on the received data. For one embodiment with reference to FIG. 1, device 136, interface controller 124, 126, and/or 128, and/or PCPMC 122 may manage power for block 204.

As illustrated in FIG. 1, system 100 for one embodiment may also have one or more input devices 140, one or more displays 150, volatile memory 160, one or more non-volatile memory and/or storage devices 170, and one or more communications interfaces 180.

Processor(s) 110 for one embodiment may include one or more memory controllers to provide an interface to volatile memory 160. Volatile memory 160 may be used to load and store data and/or instructions, for example, for system 100. Volatile memory 160 may include any suitable volatile memory, such as suitable dynamic random access memory (DRAM) for example. Processor(s) 110 for one embodiment may use PPMC(s) 112 to help manage power for volatile memory 160.

Although described as residing with processor(s) 110, one or more memory controllers for one embodiment may reside with platform control logic 120, allowing platform control logic 120 to communicate with volatile memory 160 directly.

Platform control logic 120 for one embodiment may include any suitable interface controllers, including interface controllers 124, 126, and 128, to provide for any suitable communications link to processor(s) 110 and/or to any suitable device or component in communication with platform control logic 120. Platform control logic 120 for one embodiment may use PCPMC 122 to help manage power for any suitable one or more devices and/or components in communication with platform control logic 120.

Platform control logic 120 for one embodiment may include one or more graphics controllers to provide an interface to display(s) 150. Display(s) 150 may include any suitable display, such as a cathode ray tube (CRT) or a liquid crystal display (LCD) for example. One or more graphics controllers for one embodiment may alternatively be external to platform control logic 120.

Platform control logic 120 for one embodiment may include one or more input/output (I/O) controllers to provide an interface to input device(s) 140, non-volatile memory and/or storage device(s) 170, and communications interface(s) 180.

Input device(s) 140 may include any suitable input device (s), such as a keyboard, a mouse, and/or any other suitable cursor control device.

Non-volatile memory and/or storage device(s) 170 may be used to store data and/or instructions, for example. Non-volatile memory and/or storage device(s) 170 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Communications interface(s) 180 may provide an interface for system 100 to communicate over one or more networks and/or with any other suitable device. Communications interface(s) 180 may include any suitable hardware and/or firmware. Communications interface(s) 180 for one embodiment may include, for example, a network adapter, a wireless network adapter, a telephone modem, and/or a wireless modem. For wireless communications, communications interface(s) 180 for one embodiment may use one or more antennas 182.

Downstream devices 132, 134, 135, 136, 137, and 138 for one embodiment may be any suitable device that may be coupled to platform control logic 120 such as, for example and without limitation, a suitable input device 140, a suitable non-volatile memory or storage device 170, a suitable communications interface 180, or any other suitable I/O device. Examples of a downstream device may include, without limitation, a cursor control device, a storage drive, a storage device, a bus agent, a bridge device, a hub device, a network router or switch, a battery charging device, a printer, a scanner, a camcorder, a camera, a media player, a cellular telephone, a smart phone, a mobile internet device, and a computer system such as a desktop, notebook, netbook, or other computer system. Device 136 may be any suitable device that supports communication with downstream devices 137 and 138. Device 136 may include, for example, a bus agent, a bridge device, or a hub device.

Although described as residing with platform control logic 120, one or more controllers of platform control logic 120, including one or more of interface controllers 124, 126, and 128, for one embodiment may reside with one or more processors 110, allowing a processor 110 to communicate with one or more devices or components directly. One or more controllers of platform control logic 120, including one or more of interface controllers 124, 126, and 128, for one embodiment may be integrated on a single die with at least a portion of one or more processors 110. One or more controllers of platform control logic 120, including one or more of interface controllers 124, 126, and 128, for one embodiment may be packaged with one or more processors 110.

Device Idle Duration Reporting

Figure 3:
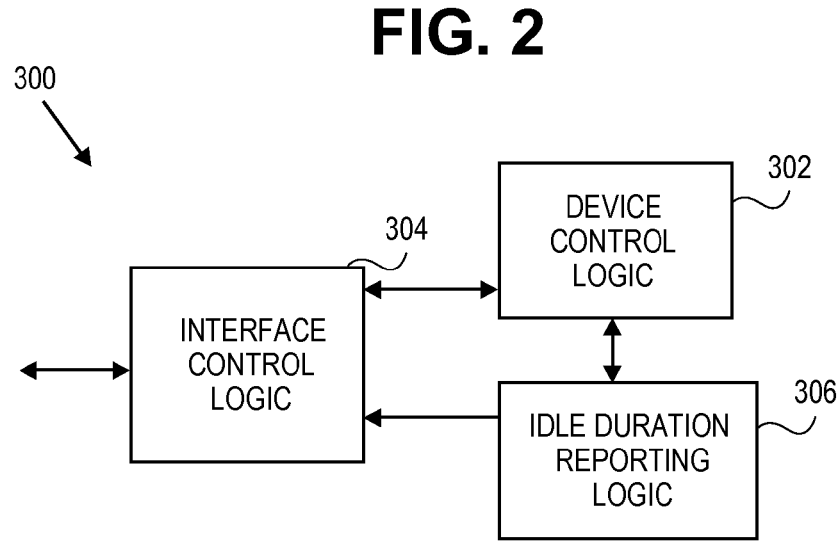
FIG. 3 illustrates, for one embodiment, a block diagram of a downstream device to report idle duration.

FIG. 3 illustrates, for one embodiment, a device 300 that may report idle duration for one or more upstream devices to manage power based at least in part on the idle duration. Device 300 for one embodiment may correspond, for example, to downstream device 132, 134, 135, or 136 of FIG. 1 and report idle duration for system 100 to manage power based at least in part on the idle duration. Device 300 for one embodiment may correspond, for example, to downstream device 137 or 138 of FIG. 1 and report idle duration for device 136 and/or system 100 to manage power based at least in part on the idle duration.

As illustrated in FIG. 3, device 300 for one embodiment may comprise device control logic 302, interface control logic 304, and idle duration reporting logic 306. Device control logic 302, interface control logic 304, and idle duration reporting logic 306 may each be implemented in any suitable manner using, for example, any suitable hardware, any suitable hardware performing any suitable firmware, any suitable hardware performing any suitable software, or any suitable combination of such implementations. For one embodiment, any such firmware and/or software may be stored in any suitable computer readable storage medium or media of device 300. Device 300 for one embodiment may also comprise other suitable logic, circuitry, and/or one or more components to implement any suitable functionality for device 300.

Device control logic 302 for one embodiment may help control the functionality of device 300 and may communicate with one or more upstream devices using interface control logic 304 to provide functionality to one or more components of such device(s).

Interface control logic 304 may be coupled to device control logic 302 to transmit and/or receive data for device 300 in any suitable manner. Interface control logic 304 for one embodiment may be compatible with any suitable one or more standard specifications such as, for example and without limitation, any suitable Peripheral Component Interface (PCI) or PCI Express (PCIe) specification.

Idle duration reporting logic 306 for one embodiment may transmit to an upstream device data corresponding to an idle duration. Idle duration reporting logic 306 for one embodiment may be coupled to device control logic 302 to identify that at least a portion of device 300 will be idle and to determine an idle duration for device 300.

Idle duration reporting logic 306 may identify that at least a portion of device 300 will be idle in any suitable manner. Idle duration reporting logic 306 for one embodiment may identify that at least a portion of device 300 will not communicate with one or more upstream devices.

Idle duration reporting logic 306 may determine an idle duration for device 300 in any suitable manner. Idle duration reporting logic 306 for one embodiment may determine an amount of time that at least a portion of device 300 will be idle. Idle duration reporting logic 306 for one embodiment may determine an amount of time that at least a portion of device 300 will be idle from about the current time going forward. Idle duration reporting logic 306 for one embodiment may determine an amount of time that at least a portion of device 300 will not communicate with an upstream device. Idle duration reporting logic 306 for one embodiment may determine a minimum amount of time that at least a portion of device 300 will be idle. Idle duration reporting logic 306 for one embodiment may determine an amount of time when at least a portion of device 300 will next communicate with an upstream device.

Idle duration reporting logic 306 for one embodiment may compute an amount of time that at least a portion of device 300 will be idle based on any suitable one or more parameters. Idle duration reporting logic 306 for one embodiment may identify from a lookup table, for example, an amount of time that at least a portion of device 300 will be idle based on any suitable one or more parameters.

Idle duration reporting logic 306 for one embodiment may be coupled to transmit data corresponding to an idle duration in any suitable manner using interface control logic 304. Idle duration reporting logic 306 for one embodiment may transmit data corresponding to a determined amount of time that at least a portion of device 300 will be idle. Idle duration reporting logic 306 for one embodiment may transmit data corresponding to an idle duration about when an amount of time that at least a portion of device 300 will be idle is determined. Idle duration reporting logic 306 for one embodiment may transmit data corresponding to an idle duration about when at least a portion of device 300 becomes idle.

As at least a portion of device 300 may continue to transition to and from idle states, idle duration reporting logic 306 for one embodiment may continue to transmit data corresponding to idle durations.

For one example, device control logic 302 for one embodiment may include a buffer to receive data from another device over any suitable communications link, including any suitable wireless link, for subsequent transfer from the buffer to an upstream device using interface control logic 304. Idle duration reporting logic 306 for one embodiment may identify that the buffer is being filled and that device 300 will not yet communicate with an upstream device to initiate a transfer of data from the buffer to the upstream device. Idle duration reporting logic 306 for one embodiment may determine an idle duration for device 300 based at least in part on the capacity of the buffer and the rate at which the buffer is being filled. The determined idle duration for one embodiment may correspond to when device control logic 302 will initiate the transfer of data from the buffer to the upstream device. Idle duration reporting logic 306 for one embodiment may then transmit data corresponding to the idle duration to an upstream device using interface control logic 304.

For one embodiment where device 300 may have multiple functions, idle duration reporting logic 306 for one embodiment may report idle durations for corresponding functions of device 300.

Figure 4:
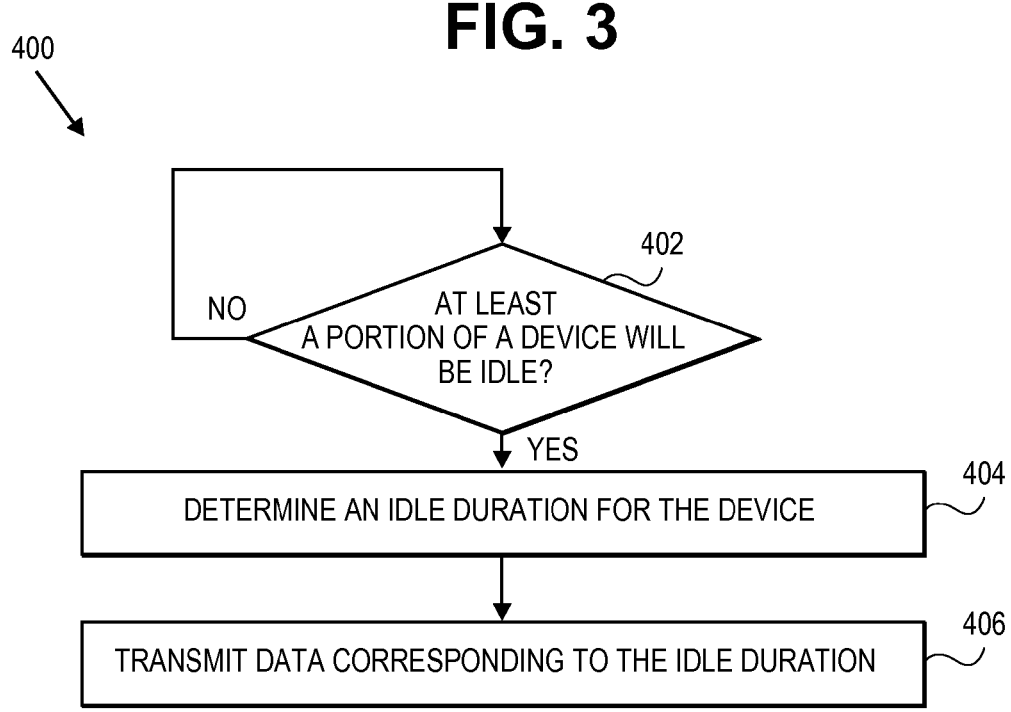
FIG. 4 illustrates, for one embodiment, an example flow diagram for a downstream device to report idle duration.

FIG. 4 illustrates an example flow diagram 400 for one embodiment of device 300 to report idle duration to an upstream device. As illustrated in FIG. 3, idle duration reporting logic 306 may identify for block 402 whether at least a portion of device 300 will be idle. If so, idle duration reporting logic 306 for block 404 may determine an idle duration for device 300. Idle duration reporting logic 306 for block 406 may transmit data corresponding to the idle duration.

Idle Duration Reporting for Multiple Devices/Functions

Figure 5:
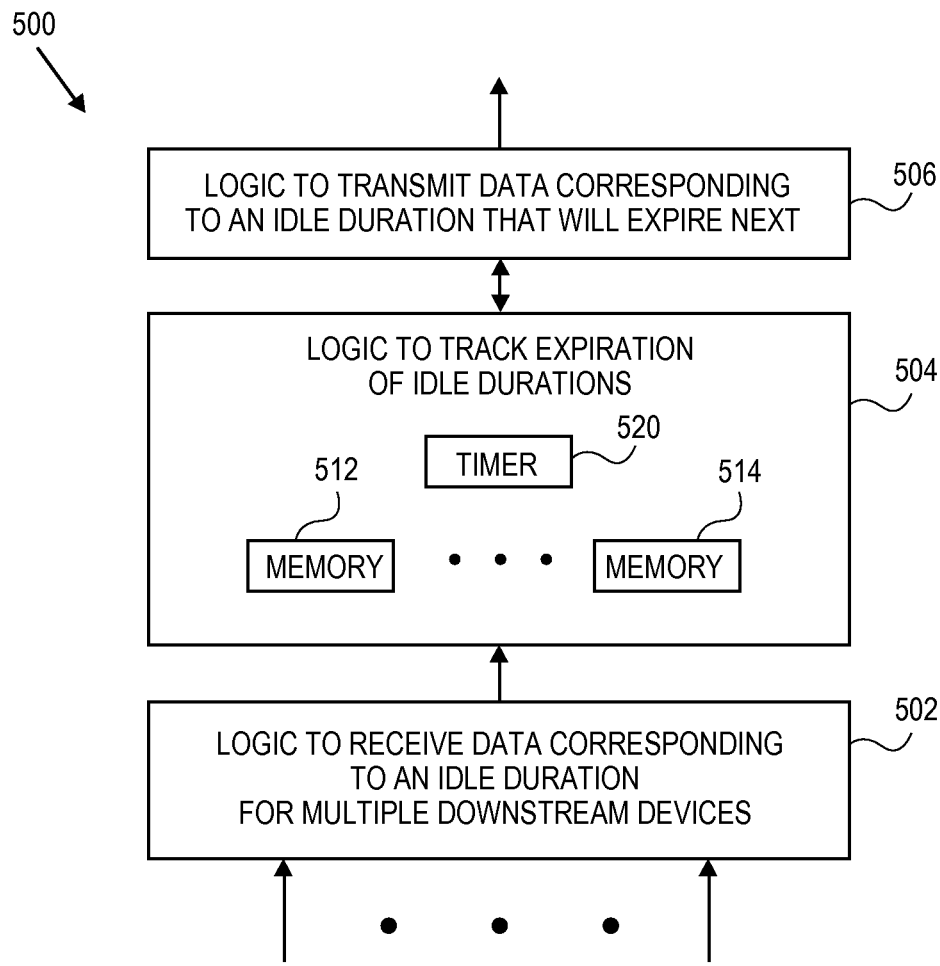
FIG. 5 illustrates, for one embodiment, a block diagram of logic to report idle duration for multiple downstream devices/functions.

FIG. 5 illustrates, for one embodiment, logic 500 to report idle duration for multiple downstream devices or multiple functions of one or more downstream devices. Logic 500 may be used, for example, to transmit data corresponding to an idle duration that will expire next from potentially multiple, overlapping idle durations for one or more downstream devices. Logic 500 for one embodiment may be used to help prioritize the upstream transmission of data corresponding to idle durations for one or more downstream devices, for example, to help PCPMC 122 to identify more quickly data corresponding to an idle duration that will expire next.

Logic 500 for one embodiment may be used, for example, by device 136 to transmit data corresponding to an idle duration that will expire next from idle durations for devices 137 and 138. Logic 500 for one embodiment may be used, for example, by interface controller 126 to transmit data corresponding to an idle duration that will expire next from idle durations for devices 134 and 135. Logic 500 for one embodiment may be used, for example, by PCPMC 122 to identify data corresponding to an idle duration that will expire next from idle durations for devices coupled to interface controllers 124, 126, and 128.

As illustrated in FIG. 5, logic 500 includes logic 502 to receive data corresponding to an idle duration for multiple downstream devices or multiple functions of one or more downstream devices, logic 504 to track expiration of idle durations, and logic 506 to transmit data corresponding to an idle duration that will expire next. Logic 502, 504, and 506 may each be implemented in any suitable manner using, for example, any suitable hardware, any suitable hardware performing any suitable firmware, any suitable hardware performing any suitable software, or any suitable combination of such implementations. For one embodiment, any such firmware and/or software may be stored in any suitable computer readable storage medium or media.

Logic 502 may be coupled to receive data corresponding to idle durations for multiple downstream devices or multiple functions of one or more downstream devices in any suitable manner. Logic 504 may be coupled to receive such data to track expiration of idle durations in any suitable manner. Logic 504 for one embodiment, as illustrated in FIG. 5, may include memory locations, such as memory locations 512 and 514 for example, each corresponding to a respective device, function of a device, or component downstream from logic 500 to store data corresponding to an idle duration. Logic 504 for one embodiment may compare data in such memory locations to a current value of a timer 520 to identify whether an idle duration corresponding to data in a memory location has expired. Logic 504 for one embodiment may add a current value of timer 520 to an idle duration corresponding to newly received data and store data corresponding to the resulting value in a corresponding memory location.

Memory locations for logic 504 may be implemented in any suitable manner such as, for example, with a register. Timer 520 may be implemented in any suitable manner such as, for example, with a counter.

Logic 506 may be coupled to logic 504 to help identify an idle duration that will expire next and transmit data corresponding to that idle duration in any suitable manner. Logic 506 for one embodiment may identify an idle duration that will expire next based at least in part on a comparison of any data corresponding to a pending idle duration in memory locations of logic 504. Logic 506 for one embodiment may transmit data corresponding to an idle duration that will expire next in response to expiration of an idle duration as identified by logic 504. Logic 506 for one embodiment may transmit data corresponding to an idle duration that will expire next in response to receipt of new data corresponding to an idle duration.

Figure 6:
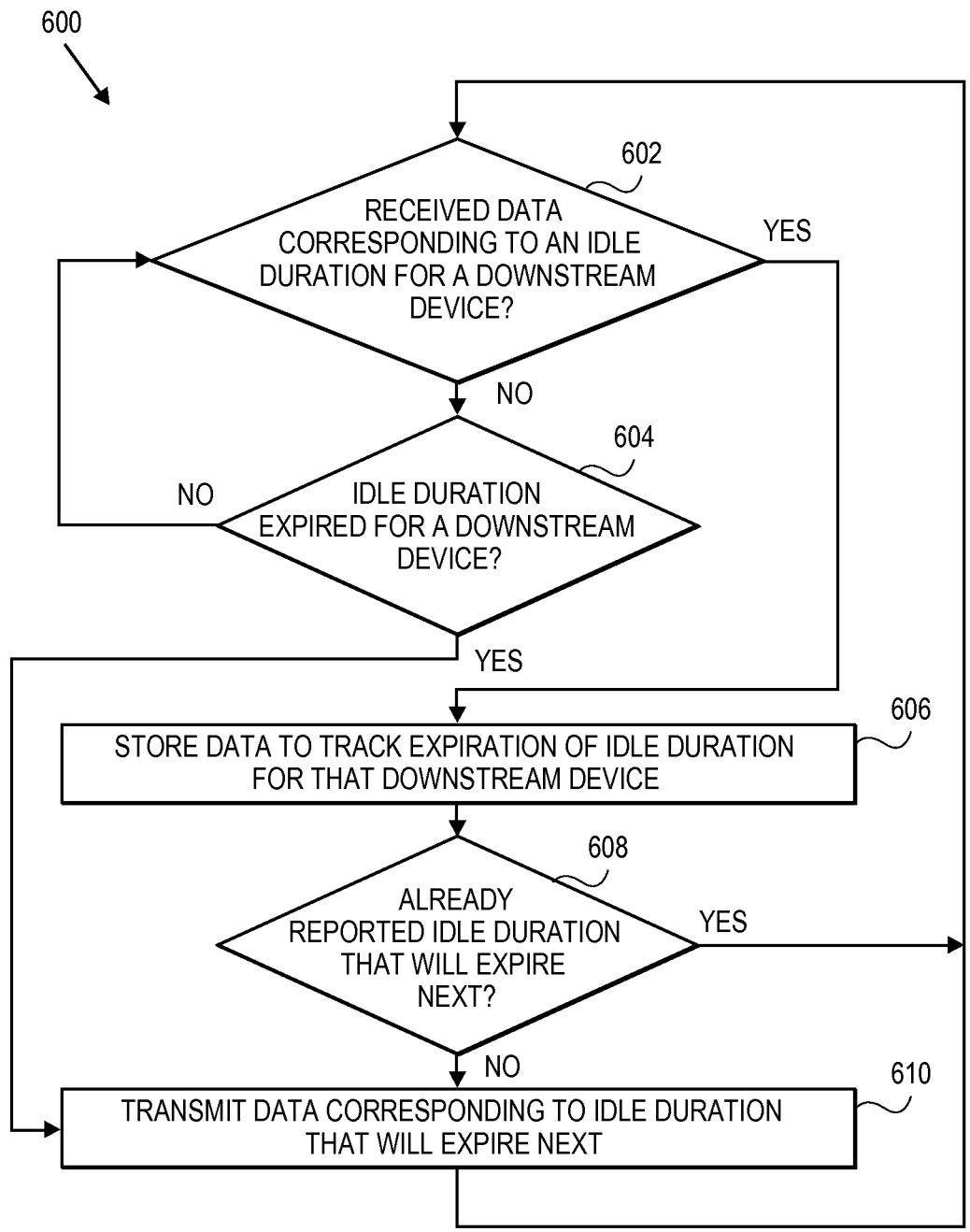
FIG. 6 illustrates, for one embodiment, an example flow diagram to report idle duration for multiple downstream devices/functions.

FIG. 6 illustrates an example flow diagram 600 for one embodiment of logic 500 to report idle duration for multiple downstream devices or multiple functions of one or more downstream devices. As illustrated in FIG. 6, logic 502 and/or logic 504 may identify for block 602 whether data corresponding to an idle duration for a downstream device has been received.

If so, logic 504 for block 606 may store data to track expiration of the idle duration for that downstream device. For block 608, logic 506 and/or logic 504 for one embodiment may identify an idle duration that will expire next and identify whether that idle duration has already been reported. If not, logic 506 for block 610 may transmit data corresponding to that idle duration. In this manner, a new idle duration that will expire sooner than any other pending idle duration may be timely reported.

If data corresponding to an idle duration for a downstream device has not been received for block 602, logic 504 for block 604 may identify whether any idle duration for a downstream device has expired. If so, for block 610, logic 506 and/or logic 504 may identify any other pending idle duration that will expire next, and logic 506 may transmit data corresponding to that idle duration. For one embodiment where logic 504 does not have any pending idle durations, logic 506 for one embodiment may transmit data corresponding to an idle duration of a predetermined maximum value.

Logic 500 for one embodiment may continue to perform operations for blocks 602-610 in this manner.

FIGS. 7-16 illustrate an example of states for one embodiment of logic 500 at ten instances of time in accordance with the receipt of data corresponding to idle durations for three downstream devices.

Figure 7:
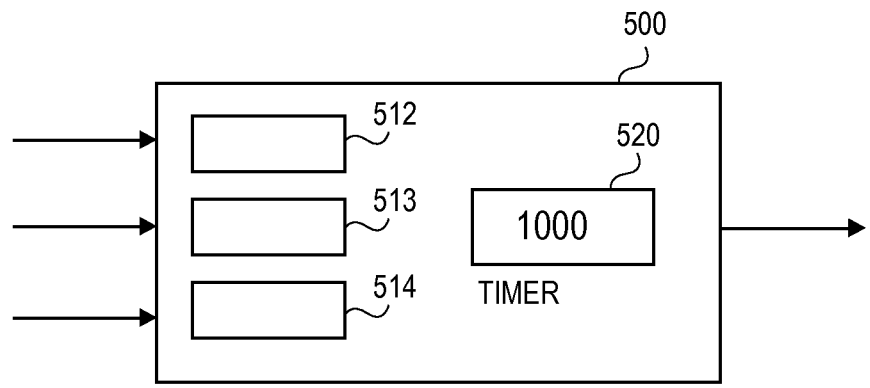
FIG. 7 illustrates, for one embodiment, an example state for idle duration reporting logic at a first time.

As illustrated in FIG. 7, logic 500 for one embodiment may have three memory locations 512, 513, and 514 corresponding to idle durations for a first, second, and third downstream device. At a first time for logic 500, timer 520 may have a value of 1000.

Figure 8:
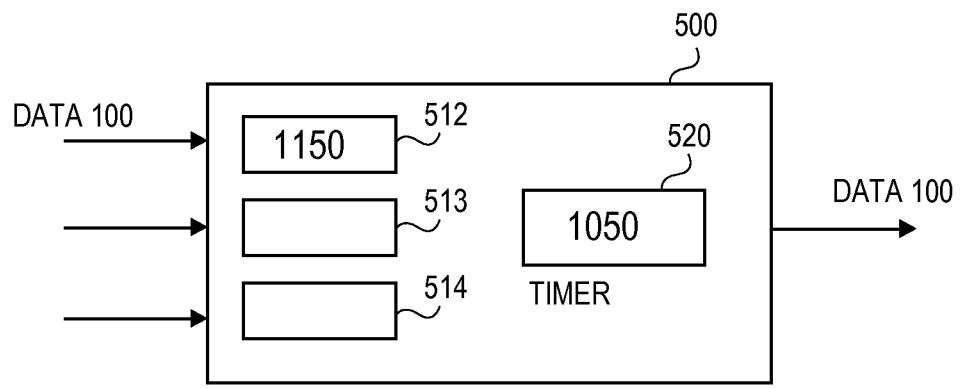
FIG. 8 illustrates, for one embodiment, an example state for idle duration reporting logic at a second time.

At a second time for logic 500, as illustrated in FIG. 8, timer 520 may have a value of 1050. Logic 500 may receive data corresponding to an idle duration of 100 for the first downstream device and store in memory location 512 data corresponding to the sum (1050) of that idle duration (100) with the current value (1050) of timer 520. Because this new idle duration will expire next for logic 500, logic 500 may transmit data corresponding to that idle duration.

Figure 9:
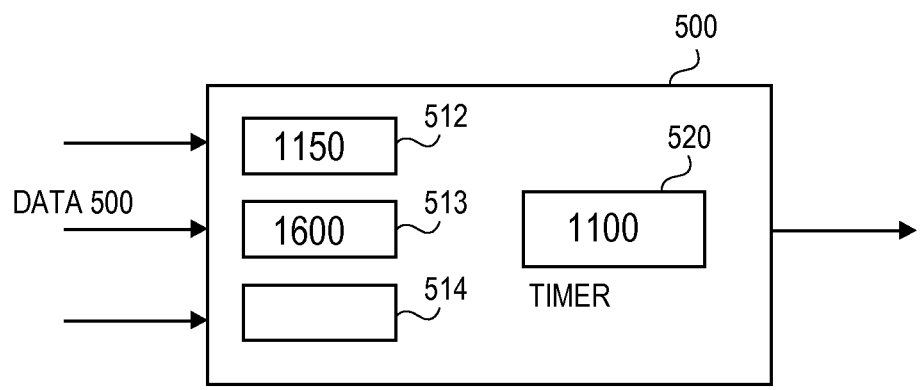
FIG. 9 illustrates, for one embodiment, an example state for idle duration reporting logic at a third time.

At a third time for logic 500, as illustrated in FIG. 9, timer 520 may have a value of 1100. Logic 500 may receive data corresponding to an idle duration of 500 for the second downstream device and store in memory location 513 data corresponding to the sum (1600) of that idle duration (500) with the current value (1100) of timer 520. Because this new idle duration will not expire next for logic 500, logic 500 may not transmit any data corresponding to an idle duration.

Figure 10:
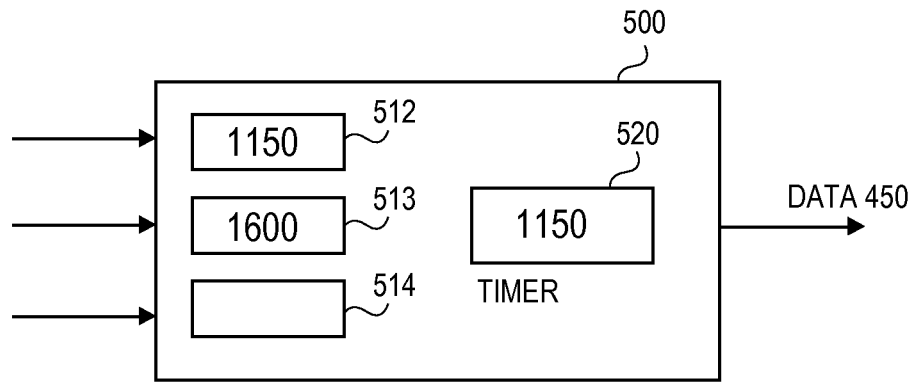
FIG. 10 illustrates, for one embodiment, an example state for idle duration reporting logic at a fourth time.

At a fourth time for logic 500, as illustrated in FIG. 10, timer 520 may have a value of 1150. Because the idle duration of memory location 512 expires at this time, logic 500 may transmit data corresponding to the idle duration of memory location 513 as that idle duration will expire next. Logic 500 may transmit data corresponding to an idle duration of 450 which is the remaining time for that idle duration.

Figure 11:
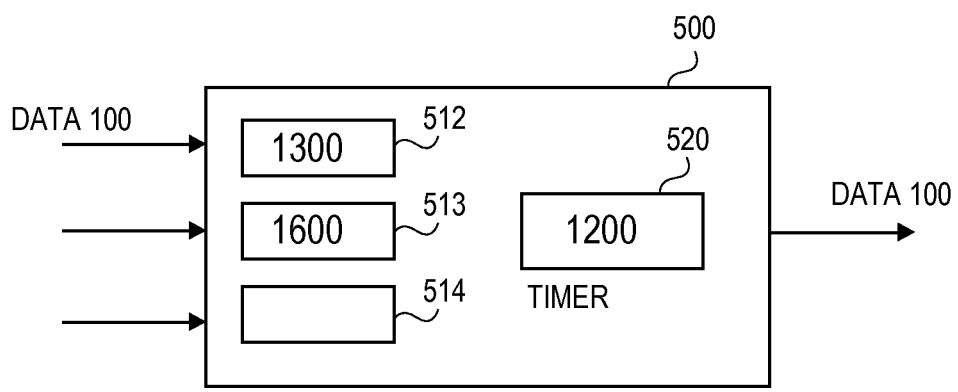
FIG. 11 illustrates, for one embodiment, an example state for idle duration reporting logic at a fifth time.

At a fifth time for logic 500, as illustrated in FIG. 11, timer 520 may have a value of 1200. Logic 500 may receive data corresponding to an idle duration of 100 for the first downstream device and store in memory location 512 data corresponding to the sum (1300) of that idle duration (100) with the current value (1200) of timer 520. Because this new idle duration will expire sooner than the idle duration for memory location 513 and therefore will expire next for logic 500, logic 500 may transmit data corresponding to the new idle duration.

Figure 12:
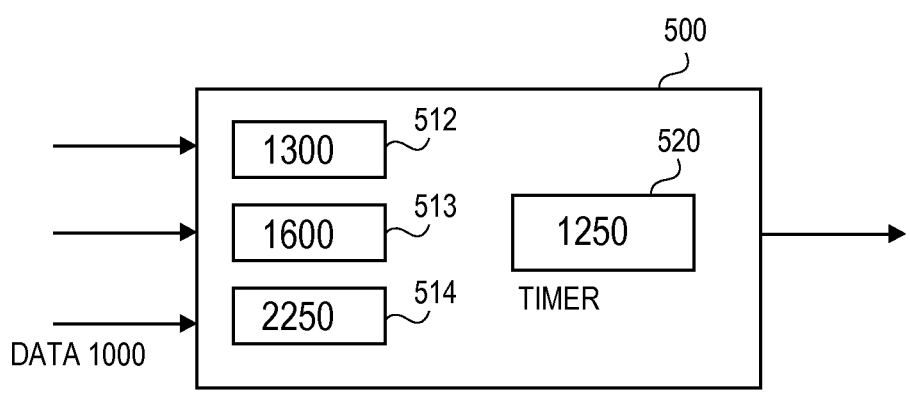
FIG. 12 illustrates, for one embodiment, an example state for idle duration reporting logic at a sixth time.

At a sixth time for logic 500, as illustrated in FIG. 12, timer 520 may have a value of 1250. Logic 500 may receive data corresponding to an idle duration of 1000 for the third downstream device and store in memory location 514 data corresponding to the sum (2250) of that idle duration (1000) with the current value (1250) of timer 520. Because this new idle duration will not expire next for logic 500, logic 500 may not transmit any data corresponding to an idle duration.

Figure 13:
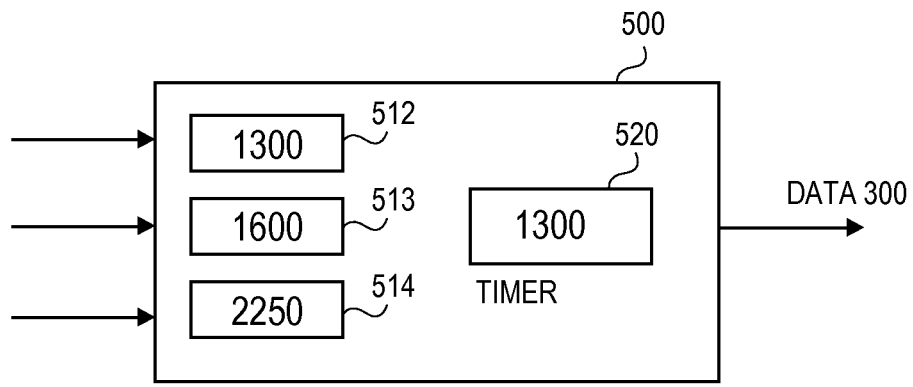
FIG. 13 illustrates, for one embodiment, an example state for idle duration reporting logic at a seventh time.

At a seventh time for logic 500, as illustrated in FIG. 13, timer 520 may have a value of 1300. Because the idle duration of memory location 512 expires at this time, logic 500 may transmit data corresponding to the idle duration of memory location 513 as that idle duration will expire sooner than the idle duration of memory location 514 and therefore will expire next. Logic 500 may transmit data corresponding to an idle duration of 300 which is the remaining time for that idle duration.

Figure 14:
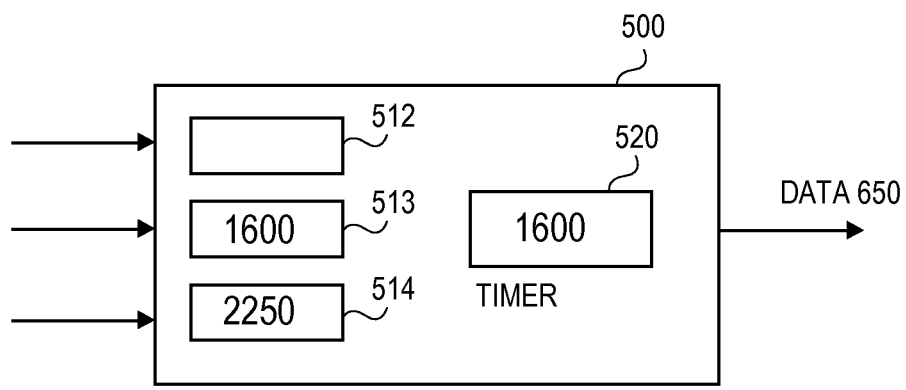
FIG. 14 illustrates, for one embodiment, an example state for idle duration reporting logic at an eighth time.

At an eighth time for logic 500, as illustrated in FIG. 14, timer 520 may have a value of 1600. Because the idle duration of memory location 513 expires at this time, logic 500 may transmit data corresponding to the idle duration of memory location 514 as that idle duration will expire next. Logic 500 may transmit data corresponding to an idle duration of 650 which is the remaining time for that idle duration.

Figure 15:
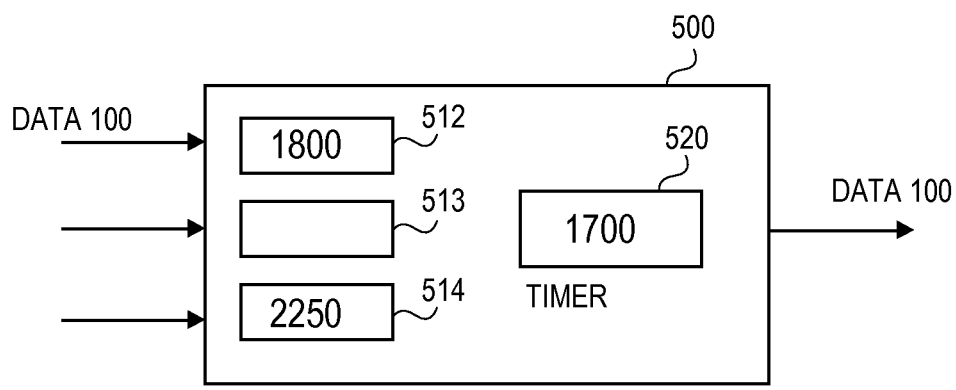
FIG. 15 illustrates, for one embodiment, an example state for idle duration reporting logic at a ninth time.

At a ninth time for logic 500, as illustrated in FIG. 15, timer 520 may have a value of 1700. Logic 500 may receive data corresponding to an idle duration of 100 for the first downstream device and store in memory location 512 data corresponding to the sum (1800) of that idle duration (100) with the current value (1700) of timer 520. Because this new idle duration will expire sooner than the idle duration for memory location 514 and therefore will expire next for logic 500, logic 500 may transmit data corresponding to the new idle duration.

Figure 16:
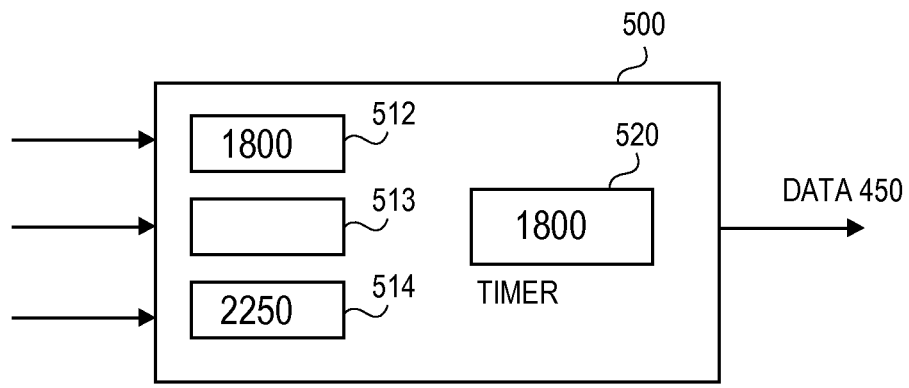
FIG. 16 illustrates, for one embodiment, an example state for idle duration reporting logic at a tenth time.

At a tenth time for logic 500, as illustrated in FIG. 16, timer 520 may have a value of 1800. Because the idle duration of memory location 512 expires at this time, logic 500 may transmit data corresponding to the idle duration of memory location 514 as that idle duration will expire next. Logic 500 may transmit data corresponding to an idle duration of 450 which is the remaining time for that idle duration.

Figure 17:
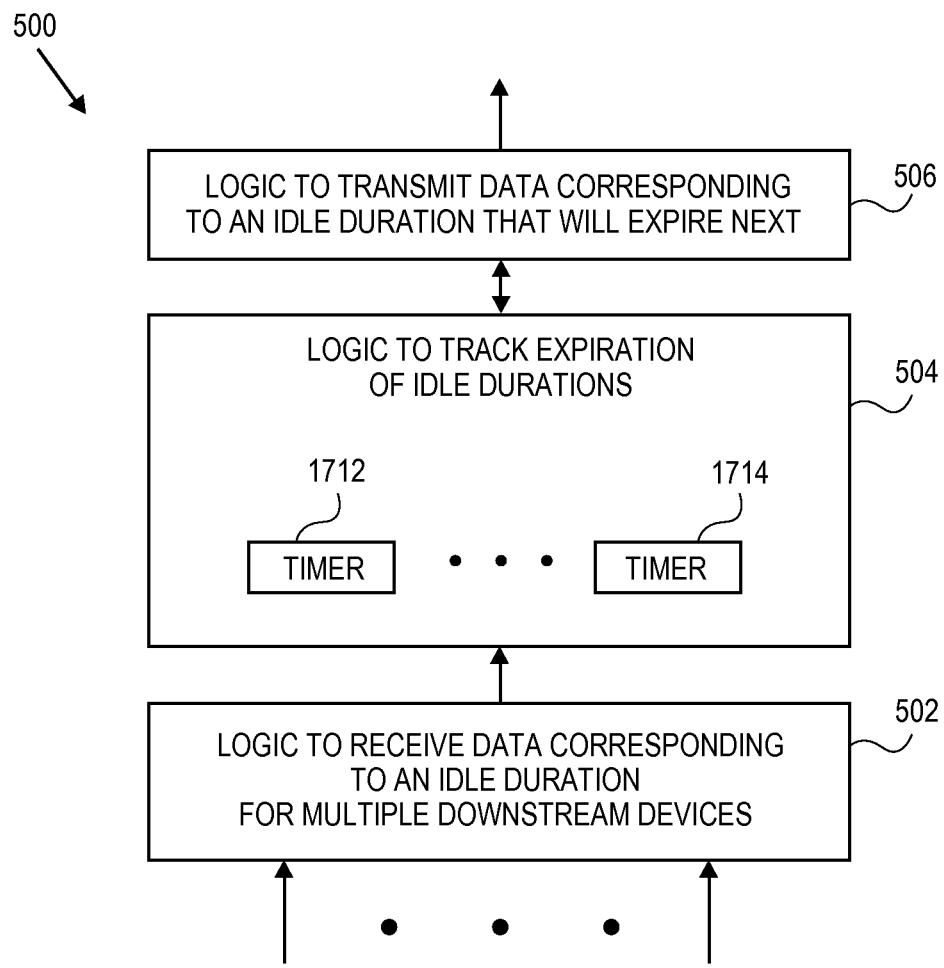
FIG. 17 illustrates, for one embodiment, a block diagram of logic to report idle duration for multiple downstream devices/functions.

FIG. 17 illustrates another embodiment of logic 500 to report idle duration for multiple downstream devices or multiple functions of one or more downstream devices. As illustrated in FIG. 17, logic 504 may include timers, such as timer 1712 and 1714 for example, each corresponding to a respective device, function of a device, or component downstream from logic 500. Logic 504 may store data corresponding to an idle duration in a corresponding timer to track expiration of that idle duration. For one embodiment, timers for logic 504 may count down to help identify when a corresponding idle duration expires and to help identify an idle duration that will expire next. Timers for logic 504 may be implemented in any suitable manner such as, for example, with a counter.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An apparatus comprising:
   logic to receive data corresponding to idle durations for multiple downstream devices;
   logic to track expiration of the idle durations; and
   logic to transmit data corresponding to a first one of the idle durations to expire next to manage power based at least in part on the first idle duration and to transmit, in response to expiration of the first idle duration, data corresponding to a second one of the idle durations to expire next to manage power based at least in part on the second idle duration,
   wherein the first idle duration and the second idle duration are to overlap in time and wherein the data corresponding to the second idle duration is to correspond to a remaining time until expiration of the second idle duration.

2. The apparatus of claim 1, wherein the logic to track expiration of idle durations is to compare data corresponding to idle durations to a timer value.

3. The apparatus of claim 1, wherein the logic to track expiration of idle durations is to store data corresponding to idle durations in corresponding timers.

4. The apparatus of claim 1, wherein the logic to receive data is to receive data corresponding to an idle duration from multiple downstream devices.

5. The apparatus of claim 1, comprising logic to manage power based at least in part on the transmitted data.

6. The apparatus of claim 5, wherein the logic to manage power is to transition to a lower power state in response to the transmitted data.

7. The apparatus of claim 5, wherein the logic to manage power is to transition from a lower power state based at least in part on when an idle duration is to expire.

8. The apparatus of claim 1, wherein the logic to receive data is to receive, after expiration of the first idle duration, data corresponding to a third one of the idle durations, and
   wherein the logic to transmit data is to transmit, prior to expiration of the second idle duration, data corresponding to the third idle duration to manage power based at least in part on the third idle duration.

9. The apparatus of claim 8, wherein the logic to transmit data is to transmit, in response to expiration of the third idle duration, data corresponding to the second idle duration to manage power based at least in part on the second idle duration.

10. A method comprising:
    receiving data corresponding to idle durations for multiple downstream devices;
    tracking expiration of the idle durations;
    transmitting data corresponding to a first one of the idle durations to expire next to manage power based at least in part on the first idle duration; and
    transmitting, in response to expiration of the first idle duration, data corresponding to a second one of the idle durations to expire next to manage power based at least in part on the second idle duration,
    wherein the first idle duration and the second idle duration overlap in time and wherein the data corresponding to the second idle duration corresponds to a remaining time until expiration of the second idle duration.

11. The method of claim 10, wherein the tracking includes comparing data corresponding to idle durations to a timer value.

12. The method of claim 10, wherein the tracking includes storing data corresponding to idle durations in corresponding timers.

13. The method of claim 10, wherein the receiving includes receiving data corresponding to idle durations from multiple downstream devices.

14. The method of claim 10, comprising managing power based at least in part on the transmitted data.

15. The method of claim 14, wherein the managing includes transitioning to a lower power state in response to the transmitted data.

16. The method of claim 14, wherein the managing includes transitioning from a lower power state based at least in part on when an idle duration is to expire.

17. The method of claim 10, wherein the receiving includes receiving, after expiration of the first idle duration, data corresponding to a third one of the idle durations, and
    wherein the method comprises transmitting, prior to expiration of the second idle duration, data corresponding to the third idle duration to manage power based at least in part on the third idle duration.

18. The method of claim 17, comprising transmitting, in response to expiration of the third idle duration, data corresponding to the second idle duration to manage power based at least in part on the second idle duration.

* * * * *